Dec. 6, 1938.   W. G. FOTSCH   2,138,913
AUTOMATIC LINE SPLICE
Filed Jan. 27, 1936
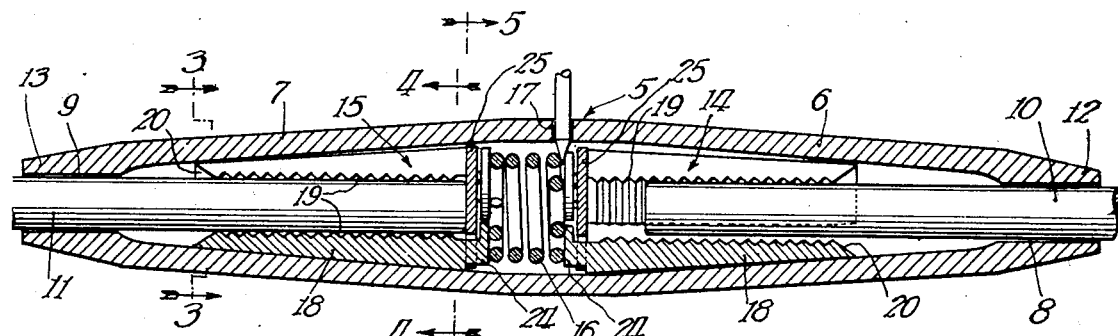
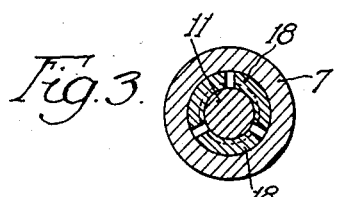
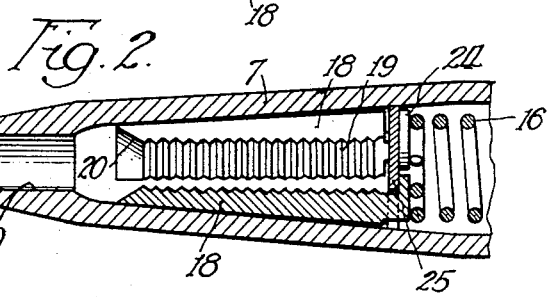
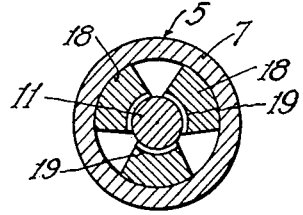
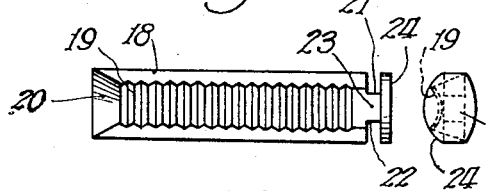
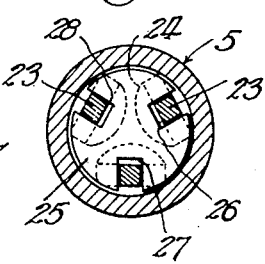
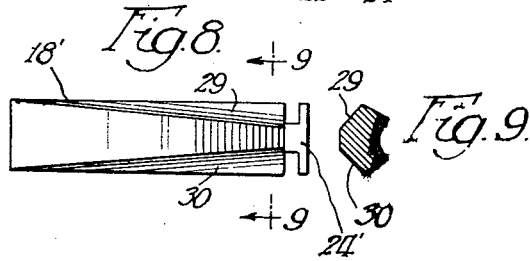
Inventor
William G. Fotsch
By: Gabel Carlson & Wells
Attys.

Patented Dec. 6, 1938

2,138,913

UNITED STATES PATENT OFFICE 2,138,913

AUTOMATIC LINE SPLICE

William G. Fotsch, Chicago, Ill., assignor to Reliable Electric Co., Chicago, Ill., a corporation of Illinois Application January 27, 1936, Serial No. 61,036

2 Claims. (Cl. 24—126)

This invention relates to line splices and more particularly to wire splicing means of the type embodying a casing tapered at both ends and housing a gripping means therein whereby a conductor may be inserted at each end of the casing and locked therein by the simple expedient of pulling outwardly on the conductor after it has been inserted.

In line splices of the type now in use, for splicing line wires and the like without the use of solder or special tools, a casing is provided which has its opposite ends tapered outwardly and which has wedge members enclosed in the casing for automatically gripping conductors inserted therein. The wedge members of these line splices are spring-pressed outwardly into the tapered end portions of the casing, the decrease in diameter of the shell forcing the wedge jaws together to bite into the wire. The tension on the wire, therefore, causes a greater wedging action and results in increased gripping of the wire by the wedge members. The wedge members may be pushed inwardly by pushing the wire into the splice against the tension of the spring within the casing, and it has heretofore been customary to release the wedge members from the wire by one of two methods.

The first method is to provide a special tool insertable into the end of the casing around the wire so as to hold the wedge member in retracted position and to permit release of the conductor. This method has its drawbacks in that it can only be used where the conductor is somewhat smaller than the end opening into the casing and thus precludes the use of a splice casing that most closely fits the wire upon which it is to be used.

The other method of releasing the wedge members consists in providing openings in the tapered end portions of the splice casing and inserting a pin or other simple tool into this opening in front of the outer ends of a wedge member after the wedge member has been pushed back by pushing the wire into the splice. This latter method of releasing the jaws, although very old in splices of this character, has the advantage that it makes it unnecessary to leave space for a tool at the end openings of the casing and permits the used wires closely fitting the end openings in the casing.

In connection with either of the above devices for releasing the wires from the line splice and particularly in connection with the latter type, there is a serious problem of preventing sufficient longitudinal shifting of one wedge member with respect to the other to nullify the releasing operation. That is, the pin inserted in the front of one jaw may hold that jaw back, but the usual spring which surrounds the jaws may permit another jaw of the group to slip forward due to this jaw hanging to the conductor. In splices for the larger sized conductors, this difficulty is more pronounced because of the fact that wedge members bite into the wire and thus become stuck to the wire so that pull outwardly on the wire will oftentimes cause them to move with the wire until the clamping action is again effective to prevent further withdrawal of the wire. It then is of little value to the lineman that he has one jaw held back since his conductor is now gripped permanently within the splice casing.

Difficulty has also been encountered in these devices due to the jaws becoming displaced with respect to each other so as to cause one of the three jaws usually employed to drop down between the other two thus making a line splice useless. This difficulty is in part obviated by increasing the width of the jaws circumferentially of the casing toward the center of the casing. Such a jaw, however, is difficult to make since it involved forming the metal so as to be tapered both crosswise and in thickness from one end to the other. To stamp jaws of this character requires special machinery and increases the cost of the line splice. The metal in the stamping must be shifted both lengthwise and transversely of the jaw.

Having in mind the above problems, it is the purpose of the present invention to provide a line splice with means to prevent sticking of the wedge members therein due to any single wedge member or all of them being forced too far into the tips of the tapered end portions of the casing by the coil spring after the release of the wire.

Furthermore, it is a purpose of this invention to provide a novel means for limiting the relative longitudinal movement of the wedge members in a set with respect to each other which means shall also perform the function of limiting the insertion of a conductor into the casing.

It is a further purpose of this invention to provide a combination of wedge members in a line splice of this character capable of retaining conductors therein and of retaining their relative positions with respect to each other although they are circumferentially separated at their larger ends because they are of the same width circumferentially of the splice casing throughout their entire length.

Other and more specific objects and advantages of the invention will appear more fully from the following description and drawing wherein the preferred form of the invention is disclosed. It is to be understood, however, that the drawing and description are illustrative only and are not to be taken as limiting the invention except in so far as it is limited by the claims.

In the drawing—

Fig. 1 is a longitudinal sectional view through a line splice embodying the invention;

Fig. 2 is a longitudinal sectional view of one end of the line splice showing the parts in their different positions;

Fig. 3 is a sectional view taken on the line 3—3 of Fig. 1;

Fig. 4 is a sectional view taken on the line 4—4 of Fig. 1;

Fig. 5 is a sectional view taken on the line 5—5 of Fig. 1;

Fig. 6 is a plan view of one of the wedge members employed;

Fig. 7 is an end view of the wedge member shown in Fig. 6;

Fig. 8 is a plan view taken on the opposite side to Fig. 6 of a modified form of wedge member; and Fig. 9 is a sectional view on the line 9—9 of Fig. 8.

Referring now in detail to the drawing, the numeral 5 indicates a casing made from a piece of metal tubing having its greatest diameter at the center and being swaged down to provide tapered end portions 6 and 7. Due to the swaging operation reducing circumference of the tube, the outer and inner surfaces of the portions 6 and 7 are tapered with the inner surface having a slightly greater taper and with a slight amount of thickening of the metal toward the free ends of the tubing. At the extreme ends of the portions 6 and 7, I preferably provide inner cylindrical surfaces 8 and 9 for closely receiving the conductors 10 and 11. This inner cylindrical surface at each end of the casing 5 is formed in the swaging of the tubing by inserting a mandrel and by drawing down the metal at the ends so that, as shown in Fig. 1, extreme end portions 12 and 13 are somewhat reduced in the thickness as compared to the body portion of the tube 5.

The cylindrical bearing portions 8 and 9 in combination with the reduction in thickness of the metal at 12 and 13 is of advantage in line splices of this character in eliminating harmful vibration of the conductors at their junction with the gripping devices in the casing 5. The surfaces 8 and 9 are made to fit closely the sizes of conductors on which the line splice is to be used so that the surfaces 8 and 9 may really act as bearings and at the same time harmful moisture and dirt may be excluded from the line splice.

Within the casing 5 formed as hereinbefore described, there are provided two sets of wedge members or jaws indicated generally at 14 and 15. A spring 16 is interposed between the sets of wedge members and presses them toward the ends of the casing 5. The free ends of the spring are given an extra turn of a reduced radius as shown in Fig. 1. A suitable opening 17 is provided midway between the tapering portions 6 and 7 of the casing 5 for the insertion of a releasing pin. The function of the releasing pin is, of course, to hold a set of jaws retracted and to permit removal of the conductor 10 as shown clearly in the right hand portion of Fig. 1 where the set of wedge members 14 is held in retracted position.

Each set of wedge shaped members is made up of a plurality of members like a member 18. Each wedge member 18 is provided with an inner roughened surface at 19 adapted to engage a conductor and has a tapered face at 20 at its small end so as to facilitate separation of the wedge members upon the insertion of a conductor therebetween. The wedge members 18, although they increase in thickness from their outer ends toward their inner ends next to the spring 16, do not increase in width since with the present construction it is not necessary to increase them in width to prevent their getting out of alignment. At the thick end of the wedge member, it is slotted as indicated at 21 and 22 so as to provide a neck portion 23 connecting a head 24 with the main body of the wedge member. Three wedge members making up a set are then connected together by a disk member 25 which is provided with slots 26, 27, and 28 arranged at angles of 120 degrees to each other around the circumference of the disk 25. The neck portion 23 of each jaw fits in one of the slots in the disk so that the jaws are radially movable on the disk 25 but are limited as to axial movement and with respect to the disk and circumferential movement with respect to the disk. The surfaces at the sides of the slots 26, 27, and 28 form parallel guides for each wedge member. The neck portions 23 of the wedge members are also provided with parallel opposite sides. The pairs of guide surfaces formed by the slots thus cooperate with the corresponding surfaces on the wedge members to prevent turning or twisting of a wedge member about its own longitudinal axis. The head portions 24 of the jaws form bearings against which the ends of the spring 16 press, and the effect of the pressure of the spring on these head portions is to force the jaws out against the inner surfaces of the tapered portions 6 and 7 at the free ends of the wedge members.

The disk 25 is sufficiently large in diameter to cause it to engage the tapered inner wall of the casing 5 before the free ends of the wedge members 18 get stuck in the ends of the casing 5. This is shown most clearly by the position of the mechanism in Fig. 2. The disk 25 also serves effectively as a stop to limit the insertion of a conductor into the casing 5. The principal function of the disk 25, however, is its positioning of the wedge members 18 to prevent their becoming disaligned with respect to each other.

The disks 25 cooperate with the opening 17 to permit holding the spring retracted as will be readily understood by reference to Fig. 1. A releasing pin can be inserted in front of the disk for either set of wedge members. The opening 17 is in the cylindrical portion of the casing 5, and therefore the opening may be drilled at any time before the tube is tapered. The rough metal projections usually pushed out by a drill in a soft metal like copper may be removed before tapering the tubing so that the interior of the casing is free from any projections that would interfere with the free movement of the wedge members.

In Figs. 8 and 9, a modified wedge member 18' is shown. This wedge member is a stamping made from strip stock, the back of the wedge member being pressed inwardly as indicated at 29 and 30 to give the increased thickness adjacent the head end 24'. This wedge member may be used interchangeably with the wedge member 18, and, owing to the fact that it can be stamped with less difficulty, it is somewhat cheaper in construction.

Having thus described my invention, what I claim as new and desire to secure by Letters Patent is:

1. A line splice comprising a piece of metal tubing having its end portions reduced in diameter to form tapering end portions and having end openings for the insertion of wires, sets of wedge members in said tubing adapted to be compressed against wires inserted therebetween by engagement with the tapered inner surfaces of the end portions of said tubing, a disk member for each set of wedge members said disk member having circumferentially spaced slots, and said wedge members having reduced neck portions in said slots interconnecting said wedge members at their larger ends and preventing longitudinal or circumferential displacement of one wedge member of a set with respect to the others, said wedge members being radially movable on their disk members, and spring means interposed between the sets of wedge members for pressing them outwardly, said metal tubing having cylindrical interior surfaces at its opposite ends providing bearings for the conductors inserted therein.

2. A line splice comprising a piece of metal tubing having its end portions reduced in diameter to form tapering end portions and having end openings for the insertion of wires sets of wedge members in said tubing adapted to be compressed against wires inserted therebetween by engagement with the tapered inner surfaces of the end portions of said tubing, a disk member for each set of wedge members interconnecting said wedge members at their larger ends and said disk member having radial slots therein, and said wedge members having neck portions seated in said slots for preventing longitudinal or circumferential displacement of one wedge member of a set with respect to the others, said wedge members being radially movable on their disk members, and spring means interposed between the sets of wedge members for pressing them outwardly, said wedge members having projections between their engagement with their respective disk members and said spring for providing a bearing surface for said spring.

WILLIAM G. FOTSCH.